United States Patent Office 3,297,723
Patented Jan. 10, 1967

3,297,723
5-PHENYL-5 LOWER ALKYL PENTANE-1,2,3,4 TETRACARBOXYLIC ACIDS AND ANHYDRIDES
Charles M. Selwitz, Monroeville, Pa., assignor to Gulf Research & Development Company, Pittsburgh, Pa., a corporation of Delaware
No Drawing. Filed Dec. 21, 1964, Ser. No. 420,109
6 Claims. (Cl. 260—347.3)

This invention relates to 5-arylpentane-1,2,3,4-tetracarboxylic acid dianhydrides, the corresponding acids, namely, 5-arylpentane-1,2,3,4-tetracarboxylic acids, as new compounds and to mixtures of epoxy resins and said 5-arylpentane-1,2,3,4-tetracarboxylic acid dianhydrides, including cured mixtures thereof, as new compositions of matter.

In preparing the new 5-arylpentane-1,2,3,4-tetracarboxylic acid dianhydrides of this invention, selected aryl compounds and maleic anhydrides are employed. The aryl compound employed can be any aryl compound carrying an alkyl substituent having from one to 70 carbon atoms, preferably from two to 12 carbon atoms, such as methyl, ethyl, n-propyl, isopropyl, 1-methyloctyl, n-dodecyl, 1-methylnonahexacontyl, 3-phenyl-3-methylheptyl, 3,4,5 - triethyldodecyl, 1 - propyl - 3 - cyclohexylnonyl, 2-methylpropyl, butyl, 1-methylpropyl, amyl, 1-methylbutyl, 2-ethylpentyl, etc. The alkyl substituent must, moreover, be one carrying at least one hydrogen on the carbon that is attached to the aryl ring. Examples of alkyl aryl compounds that can be employed include toluene, ethylbenzene, para methoxy-n-propylbenzene, cumene, 2-(alpha-naphthyl)nonane, para-n-dodecylchlorobenzene, 2-phenylheptacontane, 1,3-diphenyl-3-methylheptane, 1-phenyl-3,4,5-triethyldodecane, 4 - phenyl-6-cyclohexyldodecane, isobutylbenzene, butylbenzene, secondary butylbendene, amylbenzene, para-(1-methylbutyl)-ethoxybenzene, meta-(2-ethylpentyl)chlorobenzene, etc. To react with the alkyl aryl compounds defined above a maleic anhydride, such as maleic anhydride itself or a monosubstituted maleic anhydride, such as citraconic anhydride, ethylmaleic anhydride, methoxymaleic anhydride, etc., is employed.

In order to obtain the desired 5-arylpentane-1,2,3,4-tetracarboxylic acid dianhydrides of this invention at least about 0.05 to about three mols of the maleic anhydride are employed per mol of alkyl aryl compound. The maleic anhydride and the alkyl aryl compound are brought into contact with each other in the presence of about 0.1 to about five percent by weight, based on the maleic anhydride, of a free radical or free radical generating catalyst, for example, peroxides, such as lauroyl peroxide, cumene hydroperoxide, benzoyl peroxide, di-t-butyl peroxide, etc., azo compounds, such as azo bisisobutyronitrile, azoethane, azo biscyclohexylnitrile, etc. To facilitate the reaction an inert solvent under the conditions of the reaction, such as benzene, chlorobenzene, tetrahydrofuran, etc., can be employed.

The mixture of the maleic anhydride, the alkyl aryl compound and the free radical or free radical generating catalyst is then heated at a temperature of about 50° to about 200° C., preferably at a temperature of about 90° to about 160° C., and a pressure of about one to about 150 pounds per square inch gauge, preferably atmospheric pressure, for about 10 to about 10,000, preferably about 60 to about 3,000 minutes.

At the end of the reaction period, the desired compound, 5-arylpentane-1,2,3,4-tetracarboxylic acid dianhydride, can be recovered from the reaction mixture in any convenient manner. Thus, at the end of the reaction period, the reaction mixture is reduced to atmospheric temperature and resolves itself into an upper aromatic phase, wherein there is found the unreacted alkyl aryl compound and the unreacted maleic anhydride that may be present, and a lower solid phase, which is the desired 5-arylpentane-1,2,3,4-tetracarboxylic acid dianhydride. The two phases are separated from each other in any suitable manner, for example, by decantation. In the event the lower solid phase may contain some of the unreacted maleic anhydride, the latter can be removed therefrom, for example, by extraction with benzene.

The corresponding tetraacids, namely, 5-arylpentane-1,2,3,4-tetracarboxylic acids, can be obtained from the recovered 5-arylpentane,1,2,3,4-tetracarboxylic acid di-anhydrides by hydrolyzing with water. Thus, the 5,arylpentane-1,2,3,4-tetracarboxylic acid dianhydride can be dissolved in a suitable solvent, such as acetone, methyl ethyl ketone, dimethyl sulfoxide, acetic acid, etc., and the solution thus obtained can be treated with an excess of water, for example, about 15 to about 1000 percent by weight based on the dianhydride, and the resultant mixture is then heated for about one to about 200 hours at a temperature of about 70° to about 200° C. and at sufficient pressure to maintain the solvent in the liquid phase. The solution is then concentrated until about 20 to about 95 percent by weight of the remaining, unreacted water is removed therefrom, and upon cooling to room temperature, a solid, a 5-arylpentane-1,2,3,4-tetracarboxylic acid, is obtained which can then be air dried at atmospheric conditions.

The dianhydride of this invention can be employed to cure epoxy resins. Epoxy resins are well known in the art and comprise liquid or solid materials containing more than one oxirane oxygen atom per molecule. When the resins are cured or cross-linked they form a very hard material which is excellent for many uses, such as for encapsulation of parts such as electronic parts, as a protective coating and as an adhesive agent.

Any of the epoxy resins well known in the art can be employed in the new compositions of this invention. By an epoxy resin is meant any molecule which contains on the average more than one epoxy group. An epoxy group is a three-membered ring containing one oxygen and two carbon atoms. The one oxygen in the three-membered ring is termed an "oxirane" oxygen atom. Thus, an epoxy resin is any compound containing on the average more than one oxirane oxygen atom. Epoxy resins having molecular weights between about 86 and 4,000 are known. The liquid epoxy resins are preferred, with the liquid aromatic type epoxy resins being more preferred.

One type of preferred epoxy resin is the glycidyl ether type which has the general formula:

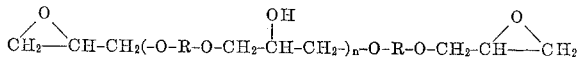

where R is a divalent hydrocarbon radical, preferably an aromatic radical, and $n$ is an integer between 0 and about 18.

In the curing of the poly epoxy compounds in accordance with this invention, it is theoretically necessary to react one epoxy equivalent with one anhydride equivalent. The 5-arylpentane-1,2,3,4-tetracarboxylic acid dianhydrides have two anhydride equivalents per molecule. The anhydride to epoxy equivalent ratio ($A/E$ ratio) using the dianhydrides of this invention can suitably vary between about 0.1 to about 0.9, with a preferred $A/E$ ratio of about 0.4 to about 0.6.

The epoxy resin compositions of this invention can be prepared by any method well known in the art. One One suitable procedure involves mixing the dianhydride of this invention with the epoxy resin at a temperature between about 20° C. and the decomposition or boiling point of the lower boiling or less stable component. The epoxy resin and the dianhydride of this invention can be mixed at room temperature with stirring, but in most cases temperatures of about 100° to about 180° C. will be preferred. Curing of the hardened epoxy resin can then be effected at a temperature at about 120° to about 250° C. for about one to about 200 hours. The cure time can be shortened by the use of 0.1 to 10.0 percent by weight, based on total mixed product, of a tertiary amine accelerator, such as benzal dimethyl amine, tris-2,4,6-dimethylaminomethylphenol, 3-picoline, triethylene diamine, etc.

As pointed out above, the new anhydrides of this invention are defined as being 5-arylpentane-1,2,3,4-tetracarboxylic acid dianhydrides, preferably as 5-phenylpentane-1,2,3,4-tetracarboxylic acid dianhydrides, which structurally can be represented as follows:

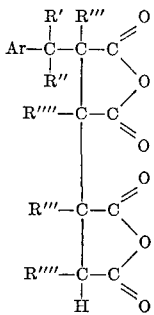

wherein R′, R″, R‴ and R‴′ are selected from the group consisting of hydrogen, alkyl or alkoxy groups having from one to nine carbon atoms, preferably from one to three carbon atoms, such as methyl, ethyl, n-propyl, isopropyl, n-butyl, secondary butyl, isobutyl, n-heptyl, n-nonyl, methoxy, etc., and Ar is an aryl radical, such as phenyl, alpha-napthyl, beta-naphthyl, para-tertiary-butyl-phenyl, diphenyl, terphenyl, ferrocenyl, furyl, thienyl, etc., preferably phenyl. The aryl radical can contain such diverse substituents as methoxy, cyano, trifluoromethyl, nitro, chloro, etc. In a preferred embodiment at least one of R′ and R″ is an alkyl substituent, such as a methyl substituent, and the compound can be defined as being a 5-aryl-5-alkylpentane-1,2,3,4-tetracarboxylic acid dianhydride, preferably a 5-phenyl-5-alkylpentane-1,2,3,4-tetracarboxylic acid dianhydride, such as a 5-phenyl-5-methylpentane-1,2,3,4-tetracarboxylic acid dianhydride. In a more preferred embodiment each of R′ and R″ are alkyl substituents, and the compound in its preferred form can be defined as being a 5-aryl-5,5-dialkylpentane-1,2,3,4-tetracarboxylic acid dianhydride, preferably a 5-phenyl-5,5 - dialkylpentane - 1,2,3,4 - tetracarboxylic acid dianhydride, such as a 5-phenyl-5,5-dimethylpentane-1,2,3,4-tetracarboxylic acid dianhydride. The corresponding tetraacids would be those wherein each of the anhydride groups in the above would be converted to two carboxylic acid groups. Specific dianhydrides and tetraacids produced herein are 5-phenylpentane-1,2,3,4-tetracarboxylic acid dianhydride,
5-phenylpentane-1,2,3,4-tetracarboxylic acid,
5-phenyl-5-methylpentane-1,2,3,4-tetracarboxylic acid dianhydride,
5-phenyl-5,5-dimethylpentane-1,2,3,4-tetracarboxylic acid dianhydride,
5-alpha-napthyl-5,5-dimethylpentane-1,2,3,4-tetracarboxylic acid dianhydride,
5-para-diphenyl-5,5-dimethylpentane-1,2,3,4-tetracarboxylic acid dianhydride,
5-ferrocenyl-5,5-dimethylpentane-1,2,3,4-tetracarboxylic acid dianhydride,
5-para-tertiarybutyl-5,5-dimethylpentane-1,2,3,4-tetracarboxylic acid dianhydride,
5-phenanthryl-5-ethylpentane tetracarboxylic acid dianhydride,
5-(beta-napthyl)-5-ethylpentane tetracarboxylic acid dianhydride,
5-(beta-naphthyl)-5-methoxypentane tetracarboxylic acid dianhydride,
5-phenyl-5-methyl-5-(2-methylbutyl)pentane tetracarboxylic acid dianhydride,
5-phenyl-1,3,5,5-tetramethylpentane tetracarboxylic acid dianhydride,
5-(alpha-naphthyl)-1,3-diethoxy-5-methyl-5-ethylpentane tetracarboxylic acid dianhydride,
5-phenyl-5-methylpentane tetracarboxylic acid,
5-phenyl-5,5-dimethylpentane tetracarboxylic acid,
5-alpha-naphthyl-5,5-dimethylpentane tetracarboxylic acid,
5-para-diphenyl-5,5-dimethylpentane tetracarboxylic acid,
5-ferrocenyl-5,5-dimethylpentane tetracarboxylic acid,
5-para-tertiarybutylphenyl-5,5-dimethylpentane tetracarboxylic acid,
5-phenanthryl-5-ethylpentane tetracarboxylic acid,
5-(beta-naphthyl)-5-ethylpentane tetracarboxylic acid,
5-(beta-naphthyl)-5-methoxypentane tetracarboxylic acid,
5-phenyl-5-methyl-5-(2-methylbutyl)pentane tetracarboxylic acid,
5-phenyl-1,3,5,5-tetramethylpentane tetracarboxylic acid,
5-(alpha-naphthyl)-1,3-diethoxy-5-methyl-5-ethylpentane tetracarboxylic acid, etc.

The invention can further be illustrated by the following:

*Example I*

To 4262 grams of cumene in a twelve-liter flask, which was blanketed with nitrogen at atmospheric pressure, and while the same was maintained at 145° C., there was added over a period of 32 hours with stirring 3092 grams of maleic anhydride and at the same time, but extending over a period of 40 hours, 2363 grams of cumene containing 60 grams of azo bisisobutyronitrile. At the end of this time colorless crystalline granules had formed in the reaction mixture. The reaction mixture was cooled to room temperature, and the colorless crystalline granules were recovered by filtration. The granules were found to have a melting point of 200° C. and subjected to carbon-hydrogen-oxygen analysis, according to the following and were found to be 5-phenyl-5,5-dimethylpentane-1,2,3,4-tetracarboxylic acid dianhydride:

| Percent By Weight | Theoretical | Found |
|---|---|---|
| Carbon | 64.6 | 64.2 |
| Hydrogen | 5.06 | 5.28 |
| Oxygen | 30.4 | 29.8 |

Confirmation of the structure of the compound was obtained by infrared analysis, which showed the molecule to contain the anhydride groups, a mono-substituted phenyl group and the absence of

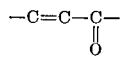

unsaturation. Moreover, cumyl succinic anhydride will not add to maleic anhydride under conditions of free radical catalysis, which eliminates the following:

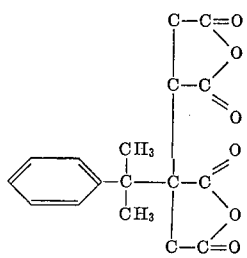

Example II

Two grams of 5-phenyl-5,5-dimethylpentane-1,2,3,4-tetracarboxylic dianhydride was dissolved in 40 grams of acetone, and to the solution there was added 206 grams of water. The resulting solution was refluxed at atmospheric pressure for 48 hours. At the end of this time, the solution was concentrated to the extent 220 grams were removed therefrom. Upon cooling to room temperature 1.8 grams of a white crystalline solid was recovered by filtration and subjected to carbon-hydrogen analysis, according to the following, and was found to be 5-phenyl-5,5-dimethylpentane-1,2,3,4-tetracarboxylic acid.

| Percent By Weight | Theoretical | Found |
|---|---|---|
| Carbon | 61.0 | 61.40 |
| Hydrogen | 6.60 | 5.34 |

Example III

A mixture of 20 grams of Epon 828 (a Shell commercial epoxide) and 6.3 grams of 5-phenyl-5,5-dimethylpentane-1,2,3,4-tetracarboxylic acid dianhydride (representing an anhydride to epoxide ratio of 0.4) was heated to 160° C. and stirred over a period of ten minutes to make a clear, homogeneous product which was poured into test bars 5" x ½" x ⅛". The test bars were cured at 200° C. over a period of 24 hours. The test bars were evaluated for heat distortion temperature by ASTM D-638 and found to have a value of 100° C., which shows the 5-phenyl-5,5-dimethylpentane-1,2,3,4-tetracarboxylic acid dianhydride to be an effective epoxy curing agent.

Obviously, many modifications and variations of the invention as hereinabove set forth can be made without departing from the spirit and scope thereof and therefore only such limitations should be imposed as are indicated in the appended claims.

I claim:
1. 5-phenyl-5-lower alkyl pentane-1,2,3,4-tetracarboxylic acid dianhydride.
2. 5-phenyl-5-methylpentane-1,2,3,4-tetracarboxylic acid dianhydride.
3. 5-phenyl-5,5-dimethylpentane-1,2,3,4-tetracarboxylic acid dianhydride.
4. 5-phenyl-5-lower alkyl pentane-1,2,3,4-tetracarboxylic acid.
5. 5-phenyl-5-methylpentane-1,2,3,4-tetracarboxylic acid.
6. 5-phenyl-5,5-dimethylpentane-1,2,3,4-tetracarboxylic acid.

References Cited by the Examiner
UNITED STATES PATENTS

| | | | |
|---|---|---|---|
| 2,692,270 | 10/1954 | Beavers | 260—347.8 |
| 2,826,556 | 3/1958 | Greenspan et al. | 260—2 |
| 3,030,387 | 4/1962 | Benoit | 260—346.8 |
| 3,032,559 | 5/1962 | Hirsch et al. | 260—346.3 |
| 3,058,921 | 10/1962 | Pannell | 260—2 |
| 3,071,597 | 1/1963 | Kauer et al. | 260—346.3 |
| 3,128,287 | 4/1964 | Berg | 260—346.8 |

ALEX MAZEL, *Primary Examiner.*

J. H. TURNIPSEED, *Assistant Examiner.*